United States Patent
David et al.

(10) Patent No.: US 10,436,271 B2
(45) Date of Patent: Oct. 8, 2019

(54) MECHANICAL PAD WEAR INDICATOR

(71) Applicant: Bendix Spicer Foundation Brake LLC, Elyria, OH (US)

(72) Inventors: Ian David, Pittsburgh, PA (US); Lonnie F. Cool, North Olmsted, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 15/897,555

(22) Filed: Feb. 15, 2018

(65) Prior Publication Data

US 2019/0249735 A1 Aug. 15, 2019

(51) Int. Cl.
| | | |
|---|---|---|
| *F16D 66/02* | (2006.01) | |
| *B60T 17/22* | (2006.01) | |
| *F16D 65/095* | (2006.01) | |
| *F16D 66/00* | (2006.01) | |

(52) U.S. Cl.
CPC .............. *F16D 66/02* (2013.01); *B60T 17/22* (2013.01); *F16D 65/095* (2013.01); *F16D 2066/003* (2013.01)

(58) Field of Classification Search
CPC ........ F16D 66/02; F16D 66/00; F16D 66/026; F16D 66/022; F16D 66/024; F16D 65/097; F16D 2300/18; B60T 17/22
See application file for complete search history.

(56) References Cited

U.S. PATENT DOCUMENTS

| | | | | |
|---|---|---|---|---|
| 3,533,491 A | * | 10/1970 | Svenson | ................. F16D 66/02 116/208 |
| 3,592,295 A | * | 7/1971 | Kennel | ................... F16D 66/02 116/208 |
| 3,961,690 A | | 6/1976 | Schanz | |

(Continued)

FOREIGN PATENT DOCUMENTS

| | | | | |
|---|---|---|---|---|
| DE | 4213581 C1 | | 5/1993 | |
| GB | 1582567 A | * | 1/1981 | .............. F16B 2/241 |

OTHER PUBLICATIONS

Bendix Spicer Foundation Brake LLC "SD-23-7541 Bendix ADB22X, ADB22X-V & ADB22X-LT Air disc Brakes," Service Data Sheet, Nov. 2017, 44 pages, Bendix Spicer Foundation Brake LLC, Elyria Ohio U.S.A.

*Primary Examiner* — Bradley T King
*Assistant Examiner* — Mahbubur Rashid
(74) *Attorney, Agent, or Firm* — Cheryl Greenly; Brian Kondas; Eugene Clair

(57) ABSTRACT

An apparatus for indicating air disc brake pad wear includes a housing having a proximate end and a distal end; wherein a first opening is located at the proximate end. The housing receives a first rigid member having a proximate end and a distal end and partially contained in the housing, the first rigid member distal end extending from the distal end of the housing and configured to attach to an associated inboard disk brake pad assembly. The first rigid member moves linearly in response to the movement of the associated disc (Continued)

brake pad such that the proximate end of the first rigid member as seen through the first opening recedes as the associated disc brake pad wears. The housing may also receive a second rigid member configured to attach to a carrier of the air disc brake assembly for determining wear on an outboard disc brake pad.

16 Claims, 8 Drawing Sheets

(56) References Cited

U.S. PATENT DOCUMENTS

| | | | |
|---|---|---|---|
| 4,356,897 A | 11/1982 | Urban | |
| 4,658,936 A * | 4/1987 | Moseley | F16D 55/40 |
| | | | 116/208 |
| 4,677,420 A * | 6/1987 | Topic | F16D 66/021 |
| | | | 116/208 |
| 4,742,326 A * | 5/1988 | Gregoire | F16D 65/0977 |
| | | | 188/1.11 L |
| 4,775,036 A * | 10/1988 | Harrison | B61H 5/00 |
| | | | 188/250 B |
| 4,991,310 A | 2/1991 | Melia | |
| 5,140,932 A * | 8/1992 | Goldfein | B60T 17/22 |
| | | | 116/208 |
| 5,228,541 A * | 7/1993 | Plude | F16D 66/02 |
| | | | 116/208 |
| 5,632,359 A | 5/1997 | Camps | |
| 5,678,662 A | 10/1997 | Girogetti | |
| 6,129,183 A | 10/2000 | Ward | |
| 6,237,723 B1 * | 5/2001 | Salsman | F16D 66/00 |
| | | | 188/1.11 W |
| 6,390,244 B1 | 5/2002 | Sitter | |
| 6,460,659 B1 | 10/2002 | Schaffer | |
| 6,481,539 B1 | 11/2002 | Shaw | |
| 7,066,302 B1 | 5/2006 | Talbert | |
| 7,370,733 B2 | 5/2008 | Nechvatal | |
| 7,845,091 B2 * | 12/2010 | Clark | G01B 3/20 |
| | | | 33/609 |
| 9,222,534 B2 * | 12/2015 | Corcoran | F16D 55/225 |
| 9,511,755 B2 * | 12/2016 | Seglo | B60T 17/22 |
| 2002/0060109 A1 * | 5/2002 | Fujiwara | F16D 66/00 |
| | | | 188/1.11 W |
| 2003/0121732 A1 * | 7/2003 | Miller | F16D 66/028 |
| | | | 188/1.11 W |
| 2005/0252727 A1 * | 11/2005 | England | F16D 65/568 |
| | | | 188/1.11 L |
| 2008/0202865 A1 * | 8/2008 | Pradier | F16D 66/02 |
| | | | 188/1.11 W |
| 2010/0031523 A1 * | 2/2010 | Clark | G01B 3/20 |
| | | | 33/609 |
| 2011/0254679 A1 * | 10/2011 | Todd | B60T 17/221 |
| | | | 340/454 |
| 2015/0330469 A1 * | 11/2015 | Corcoran | F16D 55/225 |
| | | | 188/1.11 W |

* cited by examiner

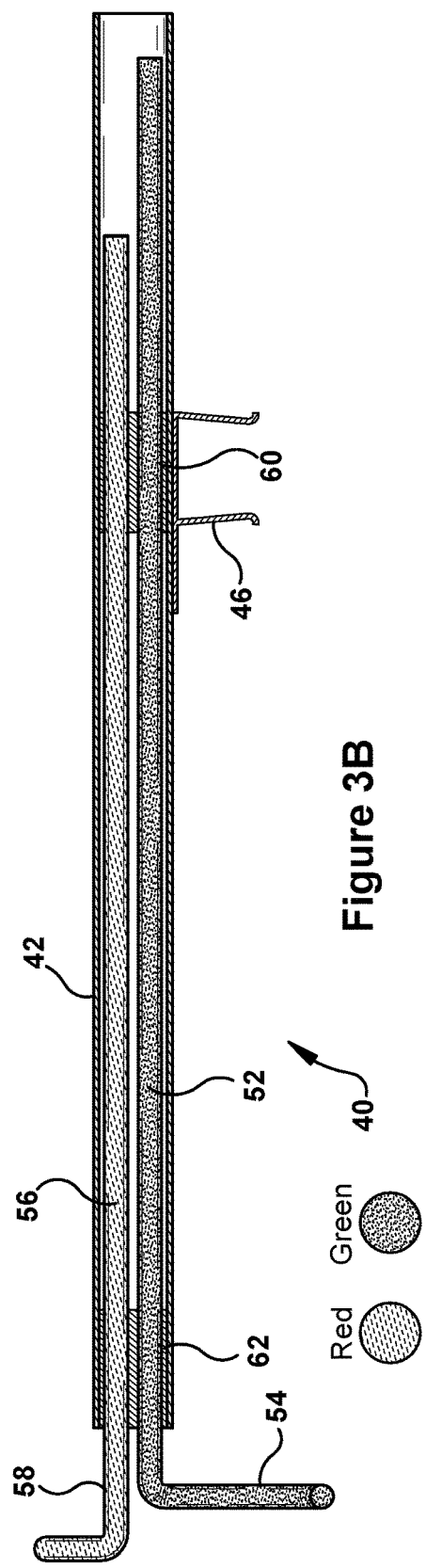

US 10,436,271 B2

MECHANICAL PAD WEAR INDICATOR

BACKGROUND

The present invention relates to embodiments of an apparatus and method for indicating air disc brake pad wear. Vehicle brake pad friction material is consumed at different rates depending on the route traveled, the terrain of the route and the behavior of the driver. A vehicle maintenance technician needs to know when and if to replace the brake pads in a brake assembly. In a commercial vehicle, access to the brake pads may be hindered due to the location of the air disc brake assembly. Electronic sensors are generally expensive and difficult to retrofit in existing air disc brake assemblies. Wires for electronic sensors are frequently abraded or cut during use, giving false wear signals. Therefore, there is a need for an inexpensive, easy to retrofit method and apparatus for indicating air disc brake pad wear that requires little to no modification of the air disc brake assembly.

SUMMARY

Various embodiments of an apparatus for indicating air disc brake pad wear include a housing having a proximate end and a distal end; wherein a first opening is located at the proximate end. The housing receives a first rigid member having a proximate end and a distal end and partially contained in the housing, the first rigid member distal end extending from the distal end of the housing and configured to attach to an associated disk brake pad assembly. The first rigid member moves linearly in response to the movement of the associated disc brake pad such that the proximate end of the first rigid member as seen through the first opening recedes as the associated disc brake pad wears.

An embodiment of a vehicle disc brake assembly having an air disc brake pad wear apparatus comprises a brake caliper; a brake carrier arranged to receive the brake caliper; a rotor; an inboard brake pad assembly installed in the brake carrier, the inboard brake pad assembly having a retaining device; and the brake pad wear apparatus mounted on the brake caliper. The brake pad wear apparatus includes a housing having a proximate end and a distal end; wherein a first opening is located at the proximate end; and a first rigid member having a proximate end and a distal end and partially contained in the housing, the first rigid member distal end extending from the distal end of the housing and configured to attach to the inboard brake pad assembly; wherein the first rigid member moves linearly in response to the movement of the inboard brake pad assembly such that the proximate end of the first rigid member as seen through the first opening recedes as the inboard brake pad assembly wears.

In accordance with another aspect, various methods of monitoring brake wear comprise installing a brake pad wear apparatus to a brake pad assembly; wearing the brake pad assembly; and monitoring at least one rigid member in the brake pad wear apparatus for movement such that the visibility of the interior portion of the brake pad wear apparatus increases as the wear increases.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 3B illustrates a partial cross-sectional view of the wear sensing device of FIG. 3A.

DETAILED DESCRIPTION

Figure 1A:
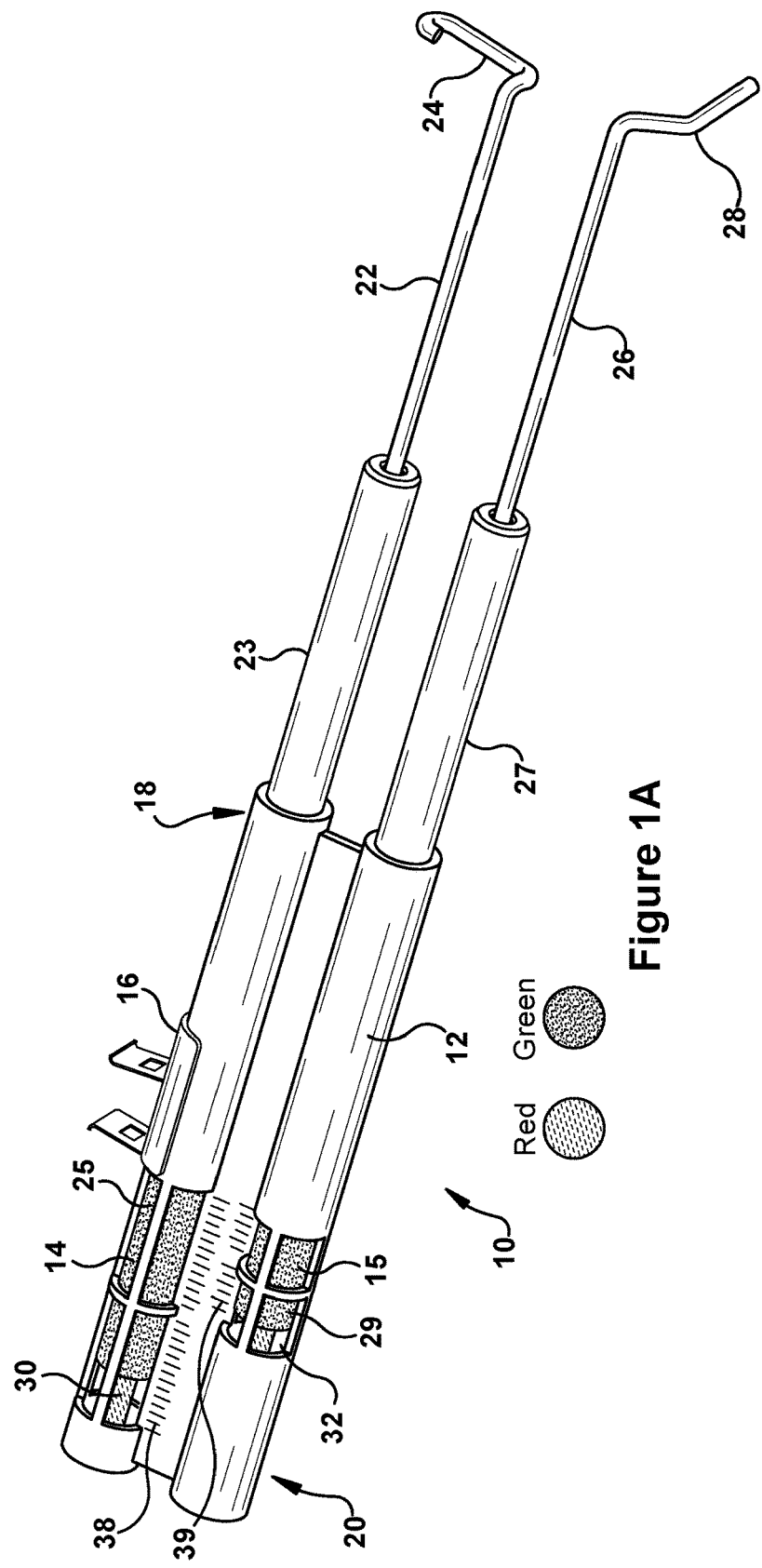
FIG. 1A illustrates a wear sensing device with two members for monitoring an outboard brake pad and total wear of the brake pad assemblies.

FIG. 1A illustrates a wear sensing device 10 for use in an air disc brake assembly. The wear sensing device 10 comprises a housing 12 having a proximate end 20 and distal end 18. The housing 12 may be made of a metallic or plastic material, based on desired cost and strength. The housing 12 comprises two generally tubular portions, or channels. The proximate end 20 of the housing 12 includes first opening 14 and second opening 15. In the example shown in FIG. 1A, the first opening 14 and second opening 15 are configured as multi-paned openings. In another example, the second opening 15 is a single opening where the first opening 14 includes two distinct openings. In another example, the openings may be a transparent portion of the housing 12. The second opening 15 is generally smaller than first opening 14.

The housing 12 may have markings, such as hash marks 38, 39, on the exterior of proximate end 20 that correspond with expected wear of the brake pad assemblies to which the wear sensing device 10 is connected.

In an approximate midpoint of the housing 12, a mounting piece 16 may be attached to the housing 12. In one example, the mounting piece 16 is integral to the housing 12.

Inside of the housing 12, an inboard indicator post 30 and an outboard indicator post 32 are installed. The inboard indicator post 30 and outboard indicator post 32 are attached to the proximate end 20 of the housing 12 and visible through the first opening 14 and second opening 15 in certain operating conditions. The inboard indicator post 30 and outboard indicator post 32 may be press fit, snap fit or spin welded into the housing 12 and remain stationary in the housing 12. In one example, the inboard indicator post 30 and the outboard indicator post 32 are a primary color, such as red. In another example, the inboard indicator post 30 and outboard indicator post 32 are a color different than the color of the housing 12.

An inboard sheath 23 is threaded or otherwise attached to the distal end 18 of the housing 12. The inboard sheath 23 may be the same material as the housing 12 or may be a different material. In one example, the inboard sheath 23 may be integral to the housing 12. The inboard sheath 23 remains stationary with respect to the housing 12. A first inboard member 22 extends from the inboard sheath 23. The first inboard member 22 may be made from a rigid material, such as spring wire. The first inboard member 22 is able slide and move linearly within the inboard sheath 23 and the housing 12. The first inboard member 22 terminates in a coupling 24 at a distal end. The shape of the coupling 24 may change based on the type of air disc brake assembly to which the wear sensing device 10 will be attached.

The first inboard member 22 is press fit, threaded or welded to a second inboard member 25. The second inboard member 25 is substantially cylindrical. The second inboard member 25 remains within the housing 12. The second inboard member 25 is configured to surround and slide freely over the inboard indicator post 30 as the first inboard member 22 moves. The second inboard member 25 is visible through the first opening 14 in certain operating conditions. In one example, the second inboard member 25 is colored green. In another example, the second inboard member 25 is a color different than the inboard indicator post 30.

In one example, the overall length of the first inboard member 22 and second inboard member 25 is between about 120 mm and 200 mm. In another example, the overall length is about 170 mm.

An outboard sheath 27 is threaded or otherwise attached to the distal end 18 of the housing 12. The outboard sheath 27 may be the same material as the housing 12 or may be a different material. In one example, the outboard sheath 27 may be integral with the housing 12. The outboard sheath 27 remains stationary with respect to the housing 12. A first outboard member 26 extends from the outboard sheath 27. The first outboard member 26 may be made from a rigid material, such as spring wire. The first outboard member 26 is able to slide and move linearly within the outboard sheath 27 and the housing 12. The first outboard member 26 terminates in a coupling 28. The shape of the coupling 28 may change based on the type of air disc brake assembly to which the wear sensing device 10 will be attached.

The first outboard member 26 is press fit, threaded or welded to a second outboard member 29. The second outboard member 29 is substantially cylindrical. The second outboard member 29 remains within the housing 12. The second outboard member 29 is configured to surround and slide freely over the outboard indicator post 32 as the first outboard member 26 moves. The second outboard member 29 is visible through the second opening 15 in certain operating conditions. In one example, the second outboard member 29 is colored green. In another example, the second outboard member 29 is a color different than the outboard indicator post 32. In another example, the second outboard member 29 is the same color as the second inboard member 25.

In one example, the overall length of the first outboard member 26 and second outboard member 29 may be between about 130 mm and about 210 mm. In another example, the overall length may be about 186 mm.

The second inboard member 25 displays about twice as much of its body in a new condition through the first opening 14 than the second outboard member 29 displays in a new condition through the second opening 15. This feature improves the detection of uneven wear.

Figure 1B:
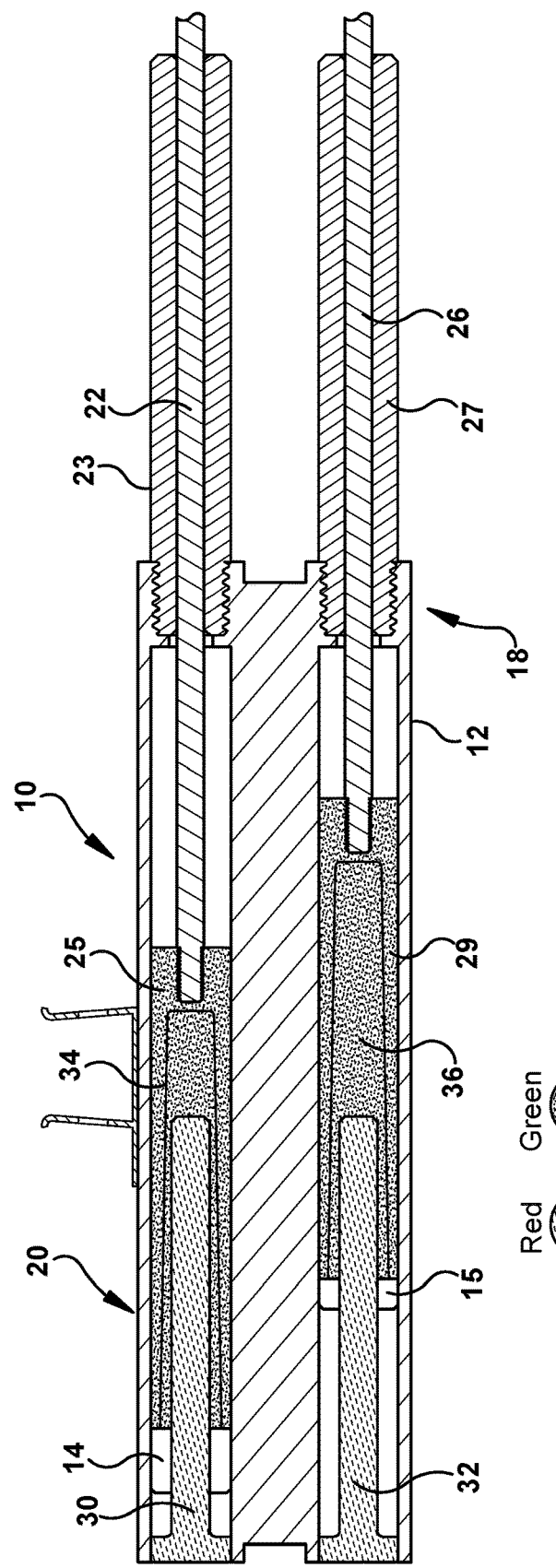
FIG. 1B illustrates a partial cross-sectional view of the wear sensing device of FIG. 1A.

FIG. 1B illustrates a partial cross-sectional view of the wear sensing device 10. The inboard indicator post 30 and outboard indicator post 32 are visible at the proximate end 20 of the housing 12. A cavity 34 in the second inboard member 25 is larger than the diameter of the inboard indicator post 30. A cavity 36 in the second outboard member 29 is larger than the diameter of the outboard indicator post 32. The inboard indicator post 30 and outboard indicator post 32 can be different colors than the second inboard member 25 and second outboard member 29 to help with the visualization of the wear of the disc brake assemblies through first opening 14 and second opening 15.

Inboard sheath 23 and outboard sheath 27 are shown as threaded into the distal end 18 of the housing 12 but can be attached by other means such as gluing. The first inboard member 22 and first outboard member 26 are able to slide freely within the inboard sheath 23 and outboard sheath 27 respectively.

In assembling the wear sensing device 10, the second inboard member 25 and second outboard member 29 are slid into the tubular portions of the housing 12. The inboard indicator post 30 and outboard indicator post 32 are then slid into the cavities 34, 36 respectively, and affixed to the proximate end 20 of the housing 12. Next, the sheaths 23, 27 are attached to the distal end 18 of the housing. The final step is affixing the first inboard member 22 through the inboard sheath 23 to the second inboard member 25 and affixing the first outboard member 26 through the outboard sheath 27 to the second outboard member 29.

Therefore, an apparatus for indicating air disc brake pad wear includes a housing having a proximate end and a distal end; wherein a first opening is located at the proximate end. The housing receives a first rigid member having a proximate end and a distal end and partially contained in the housing, the first rigid member distal end extending from the distal end of the housing and configured to attach to an associated disk brake pad assembly. The first rigid member moves linearly in response to the movement of the associated disc brake pad such that the proximate end of the first rigid member as seen through the first opening recedes as the associated disc brake pad wears.

Figure 2:
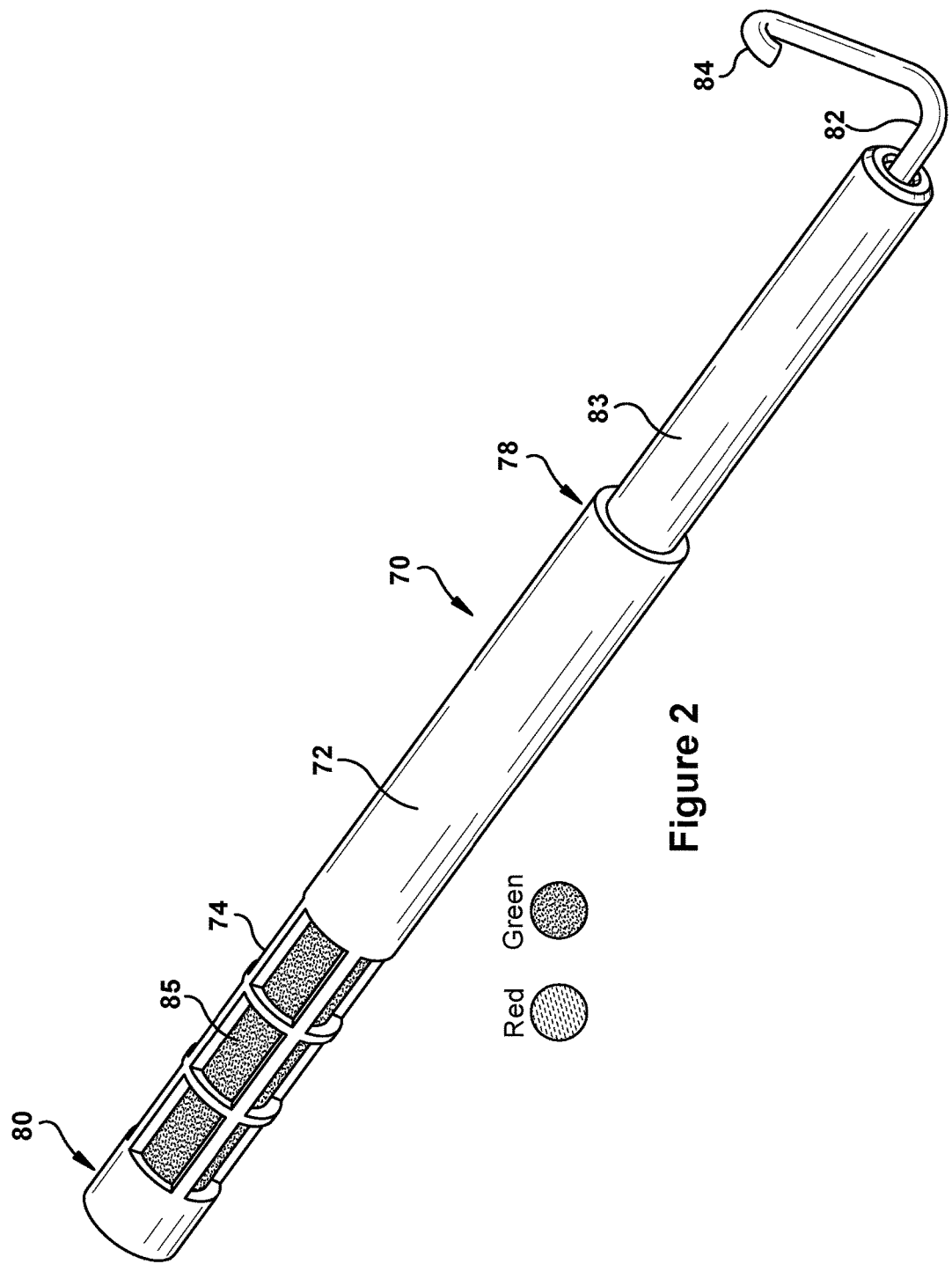
FIG. 2 illustrates a wear sensing device similar to FIG. 1A having a single member for monitoring the total wear of the brake pad assemblies.

FIG. 2 illustrates a wear sensing device 70 similar to wear sensing device 10 but with the capability to measure only the total brake wear with its single member. The wear sensing device 70 has a housing 72, which has a proximate end 80 and a distal end 78. An opening 74 is located in the proximate end 80. The opening 74 may be a single opening or a multi-paned opening as shown in FIG. 2.

Inside of the housing 72, an indicator post (not shown) is installed. The indicator post is attached to the proximate end 80 of the housing 72 and visible through the opening 74 in certain operating conditions. The indicator post may be press fit, snap fit or spin welded into the housing 72 and remains stationary in the housing 72. In one example, the indicator post is a primary color, such as red. In another example, the indicator post is a color different than the color of the housing 72.

A sheath 83 is threaded or otherwise attached to the distal end 78 of the housing 72. In one example, the sheath 83 may be integral with the housing 72. The sheath 83 remains stationary with respect to the housing 72. A first member 82 extends from the sheath 83. The first member 82 may be made from a rigid material, such as spring wire. The first member 82 is able slide and move linearly within the inboard sheath 83 and the housing 72. The first member 82 terminates in a coupling 84.

The first member 82 is press fit, threaded or welded to a second member 85. The second member 85 is substantially cylindrical. The second member 85 remains within the housing 72. The second member 85 is configured to surround and slide freely over the indicator post as the first member 82 moves. The second member 85 is visible through the opening 74 in certain operating conditions. In one example, the second member 85 is colored green. In another example, the second member 85 is a color different than the indicator post and housing 72.

In one example, the overall length of the first member 82 and second member 85 is between about 120 mm and 200 mm. In another example, the overall length is about 170 mm.

Therefore, an apparatus for indicating air disc brake pad wear includes a housing having a proximate end and a distal end; wherein a first opening is located at the proximate end. The housing receives a first rigid member at the distal end, the first rigid member connected to a second rigid member that is contained in the housing. The first rigid member is configured to attach to an associated disk brake pad assembly. The first rigid member moves linearly in response to the movement of the associated disc brake pad such that the second rigid member as seen through the opening recedes as the associated disc brake pad wears.

Figure 3A:
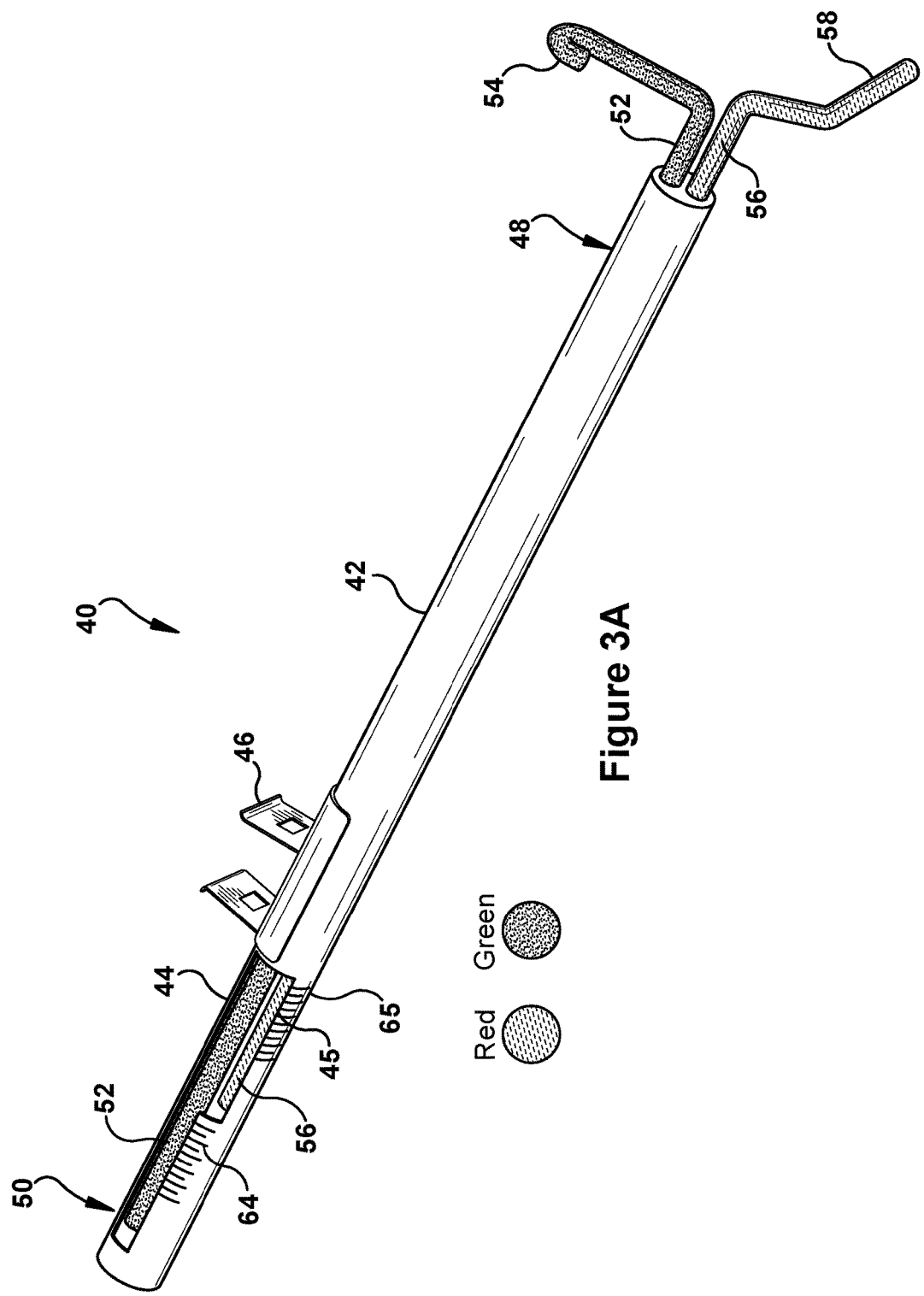
FIG. 3A illustrates another wear sensing device with two members for monitoring an outboard brake pad wear and total wear of brake pad assemblies.

FIG. 3A illustrates another wear sensing device 40 for use in an air disc brake assembly. The wear sensing device 40 comprises a housing 42 having a proximate end 50 and a distal end 48. The housing 42 may be made of a metallic or plastic material, based on desired cost and strength. The housing 42 is generally cylindrical. The proximate end 50 of the housing 42 includes first opening 44 and second opening 45. In one example, the second opening 45 is smaller than the first opening 44.

In one example, the housing 42 may have markings, such as hash marks 64, 65 on the exterior proximate end 50 that correspond with expected wear of the brake pad assemblies to which the wear sensing device 40 will be connected.

In an approximate midpoint of the housing 42, a mounting piece 46 may be attached to the housing 42. In one example, the mounting piece 42 is integral to the housing 42.

An inboard member 52 slides within the housing 42. In one example, the housing 42 includes an interior tubular section accommodating the inboard member 52. The inboard member 52 may be made from a rigid material, such as spring wire. The proximate end of the inboard member 52 is visible through the first opening 44 under certain operating conditions. The distal end of the inboard member 52 terminates in a coupling 54. The inboard member 52 may be a different color than the housing 42. In one example, the inboard member 52 may be colored green.

An outboard member 56 slides within the housing 52. In one example, the housing 42 includes an interior tubular section accommodating the outboard member 56. The outboard member 56 may be made from a rigid material, such as spring wire. The proximate end of the outboard member 56 is visible through the second opening 45 under some operating conditions. The distal end of the outboard member 56 terminates in a coupling 58. The outboard member 56 may be a different color than the housing 42 and the inboard member 52. In one example, the inboard member 52 may be colored red.

In one example, the overall length of the inboard member 52 is between about 120 mm and 200 mm. In another example, the overall length is about 170 mm. In one example, the overall length of the outboard member 56 is between about 130 mm and 210 mm. In another example, the overall length of the outboard member 56 may be about 186 mm.

FIG. 3B illustrates a partial cross-sectional view of the wear sensing device 40. The housing 42 may include guide pieces 60, 62 that keep the inboard member 52 and the outboard member 56 within the tubular sections of the housing 42.

In assembling the wear sensing device 40, the inboard member 52 and outboard member 56 are slid into the tubular portions of the housing 42 and kept from moving out of the tubular portions by the guide pieces 60, 62.

Therefore, an apparatus for indicating air disc brake pad wear includes a housing having a proximate end and a distal end; wherein a first opening is located at the proximate end. The housing receives a first rigid member having a proximate end and a distal end and partially contained in the housing, the first rigid member distal end extending from the distal end of the housing and configured to attach to an associated disk brake pad assembly. The first rigid member moves linearly in response to the movement of the associated disc brake pad such that the proximate end of the first rigid member as seen through the first opening recedes as the associated assembly having the disc brake pad wears. The housing receives a second rigid member having a proximate end and a distal end and partially contained in the housing, the second rigid member distal end extending from the distal end of the housing and configured to attach to another associated disk brake pad assembly. The second rigid member moves linearly in response to the movement of the other associated disc brake pad such that the proximate end of the second rigid member as seen through the second opening recedes as the other associated disc brake pad wears.

Figure 4:
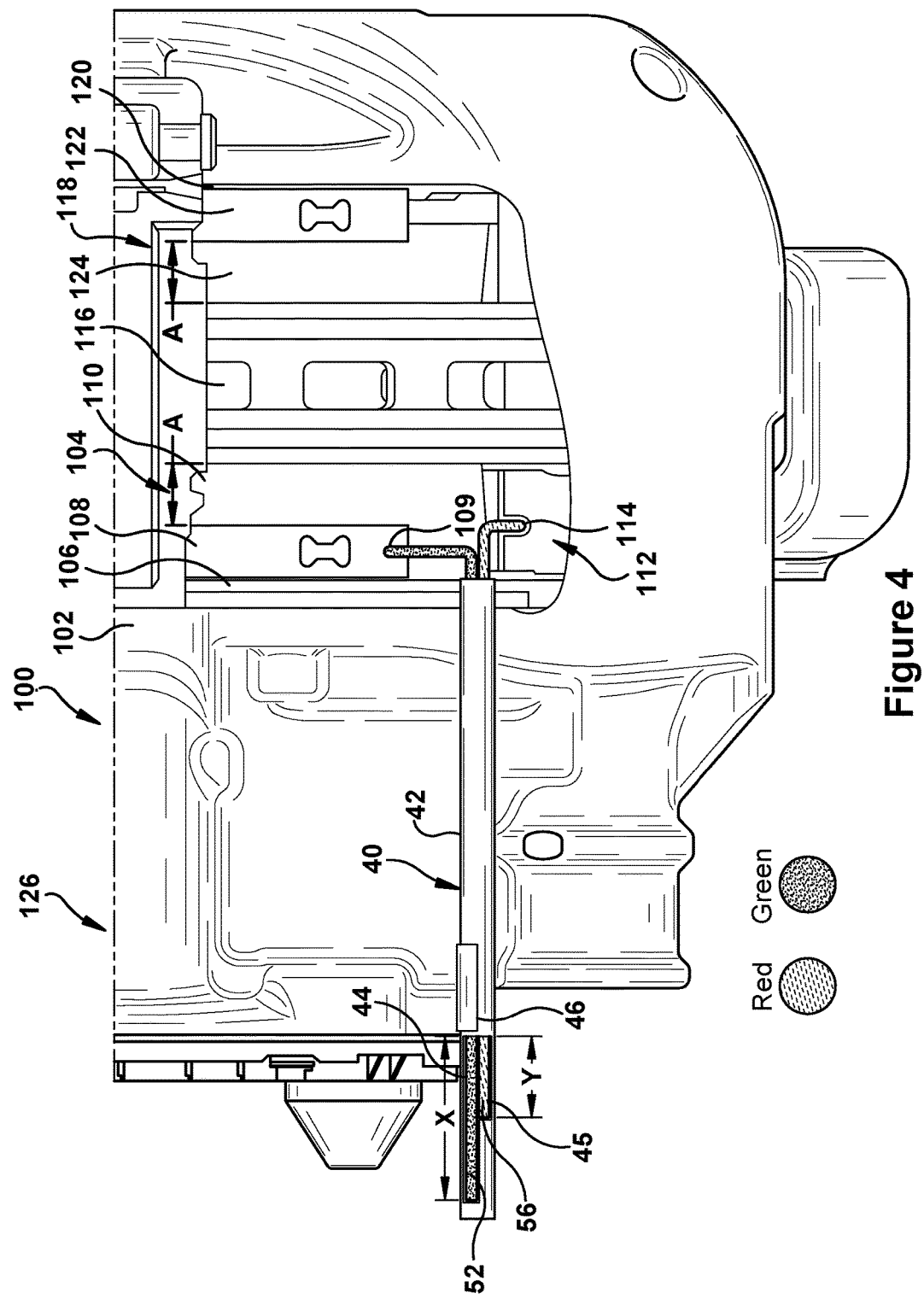
FIG. 4 illustrates an air disc brake assembly having the wear sensing device of FIG. 3A, where the brake pads are new.

FIG. 4 illustrates an air disc brake assembly 100 having the wear sensing device 40, as in FIG. 3A. The wear sensing device 40 is installed when the air disc brake assembly 100 is in a new condition. The air disc brake assembly may be a Bendix® ADB22X™ air disc brake available from Bendix Spicer Foundation Brake LLC of Elyria, Ohio. The air disc brake assembly 100 includes a caliper 102 and a carrier 112. An inboard brake pad assembly 104 is installed on the carrier 112. The inboard brake pad assembly 104 includes a backing plate 106, friction material 110 and a retaining spring 108. The friction material has a width A of between 18 mm and 25 mm in the new condition. The friction material new width may depend on whether the backing plate 106 is stamped or cast.

The air disc brake assembly 100 includes an outboard brake pad assembly 118 installed on the carrier 112 on the other side of a rotor 116 from the inboard brake pad assembly 104. The outboard brake pad assembly 118 includes a backing plate 120, friction material 124 and a retaining spring 122. The friction material has a width A of between 18 mm and 25 mm in the new condition. The friction material new width may depend on whether the backing plate 120 is stamped or cast. In general, the inboard brake pad assembly 104 and the outboard brake pad assembly 118 are identical, however they could have differently shaped backing plates.

The wear sensing device 40 is mounted to the caliper 102 using the mounting piece 46. The wear sensing device 40 is mounted in a location on the caliper 102 where it will be less exposed to debris but still be easily visible to a vehicle technician during regular maintenance checks. The wear sensing device 40 can be installed by the original equipment manufacturer (OEM) or it can be installed on an older vehicle equipped with air disc brakes by a trained vehicle technician.

The wear sensing device 40 is coupled to the inboard brake pad assembly 104 at the retaining spring 108. The coupling 54 of the inboard member 52 is connected to the retaining spring 108 by hooking the coupling 54 through an aperture 109 in the retaining spring 108. The aperture 109 in the retaining spring 108 does not affect operation of the retaining spring 108. Alternatively, the coupling 54 can be attached to an aperture formed in the backing plate 106.

The wear sensing device 40 is coupled to the carrier 112 at the coupling 58 of the outboard member 56. The coupling 58 may be inserted into the carrier 112 at an insert hole 114 specially made in the carrier 112. The insert hole 114 does not affect the operation of the carrier 112. Other means of coupling the outboard member 56 to the carrier 112 include magnets and having a boss on the carrier 112 that would include an insert hole.

The wear sensing device 40 is shown in the new installed position in FIG. 4. The proximate end of inboard member 52 is shown as being fully visible through the first opening 44 and having a visible length of X. The inboard member 52 may show "total wear" of the inboard brake pad assembly 104 and outboard brake pad assembly 118. The proximate end of outboard member 56 is shown as being partially visible through the second opening 45 and having a visible length of Y. The visible length Y is generally half of the visible length of X so that a discernable difference is made between the inboard member 52 and outboard member 56. The difference also establishes whether even wear is occurring between the inboard brake pad assembly 104 and the outboard brake pad assembly 118.

In operation, when the vehicle's brakes are depressed, an actuator pushrod (not shown) acts on the actuator receiving portion 126 of the caliper 102. The inboard brake pad assembly 104 is moved closer to the rotor 116 to slow or stop the rotation of the wheel of the vehicle. As the brakes are used, the friction material 110, 124 begins to wear away.

Figure 5:
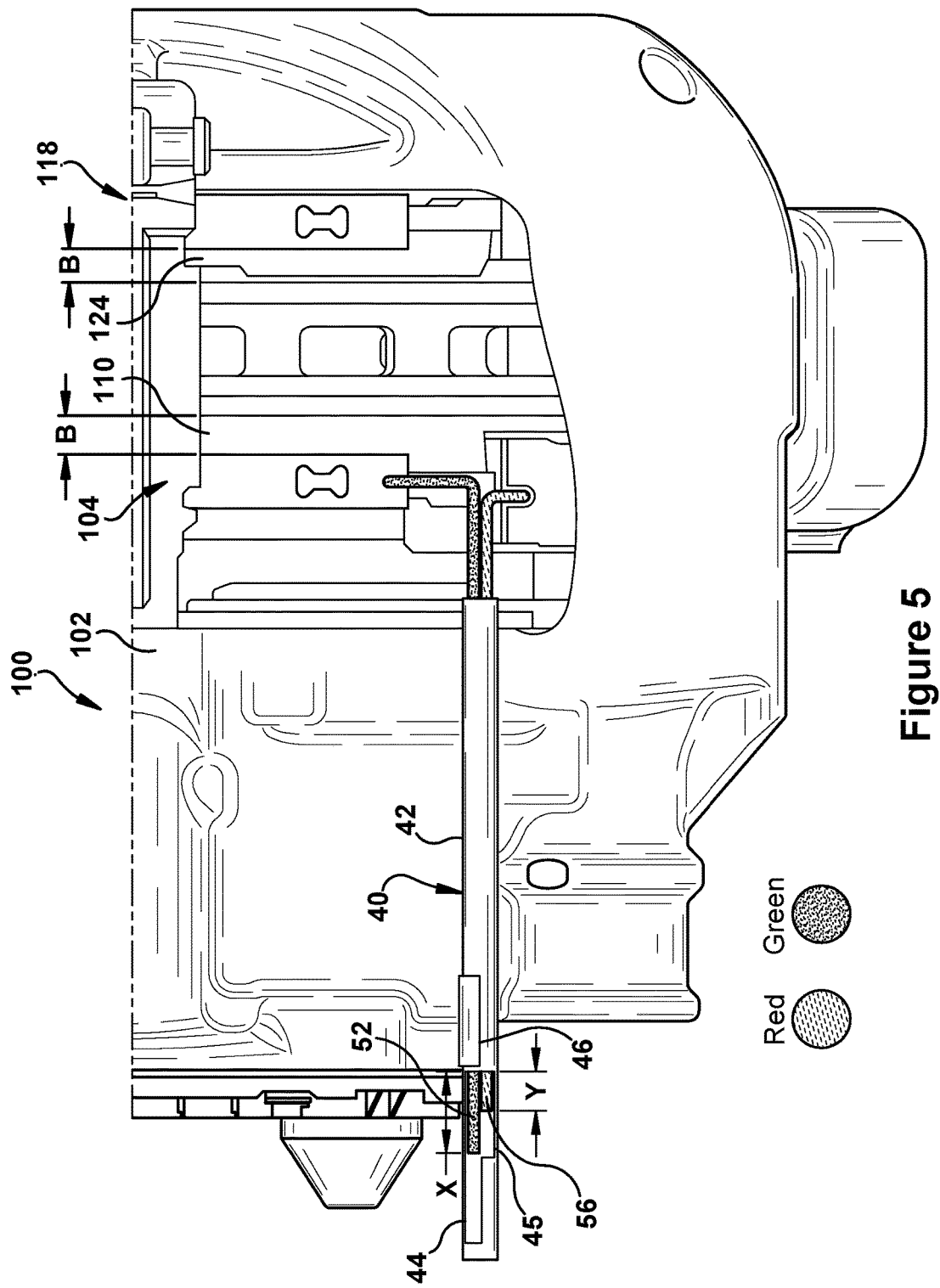
FIG. 5 illustrates the air disc brake assembly as in FIG. 4, where the brake pads are slightly worn.

FIG. 5 illustrates the air disc brake assembly 100 having the wear sensing device 40, but after a period of usage of the brakes. In this example, the friction material 110 of the inboard brake pad assembly 104 and the friction material 124 of the outboard brake pad assembly 118 has worn approximately 12 mm so that the new width B of friction material 45 and friction material 55 is about 9 mm.

Looking at the wear sensing device 40, the difference in the visible length of the inboard member 52 and the outboard member 56 is noticeable. While the visible length Y of outboard member 56 is still about half of the visible length X of inboard member 52, the overall visible length has decreased by about half such that more of the proximate end of the housing 42 is visible through the first opening 44 and the second opening 45. When the housing 42 is colored differently than the inboard member 52 and outboard member 56, the amount of wear can be visualized quickly through the first opening 44 and second opening 45. In addition, the different coloration of the inboard member 52 and outboard member 56 assist in differentiating the total wear from the outboard brake pad assembly wear.

As the outboard friction material 124 wears, the caliper 102 shifts on the carrier 112 at a rate that is proportional to the wear of the friction material 110, 124. As both the inboard friction material 110 and outboard friction material 124 begin to wear, the inboard brake pad assembly 104 shifts further away from the caliper 102.

In this example, the wear on the friction material 110 is assumed to be even with the wear on friction material 124. If the wear is not even due to an imbalance inside the caliper adjustment mechanism, wobbling of the rotor or other problem, the difference between the visible lengths of the inboard member 52 and the outboard member 56 will not be approximately half. In this manner, the vehicle technician can also check for uneven wear of the brake pads and make adjustments as necessary. The technician does not need to take the wheels off of the vehicle to check brake pad wear.

Figure 6:
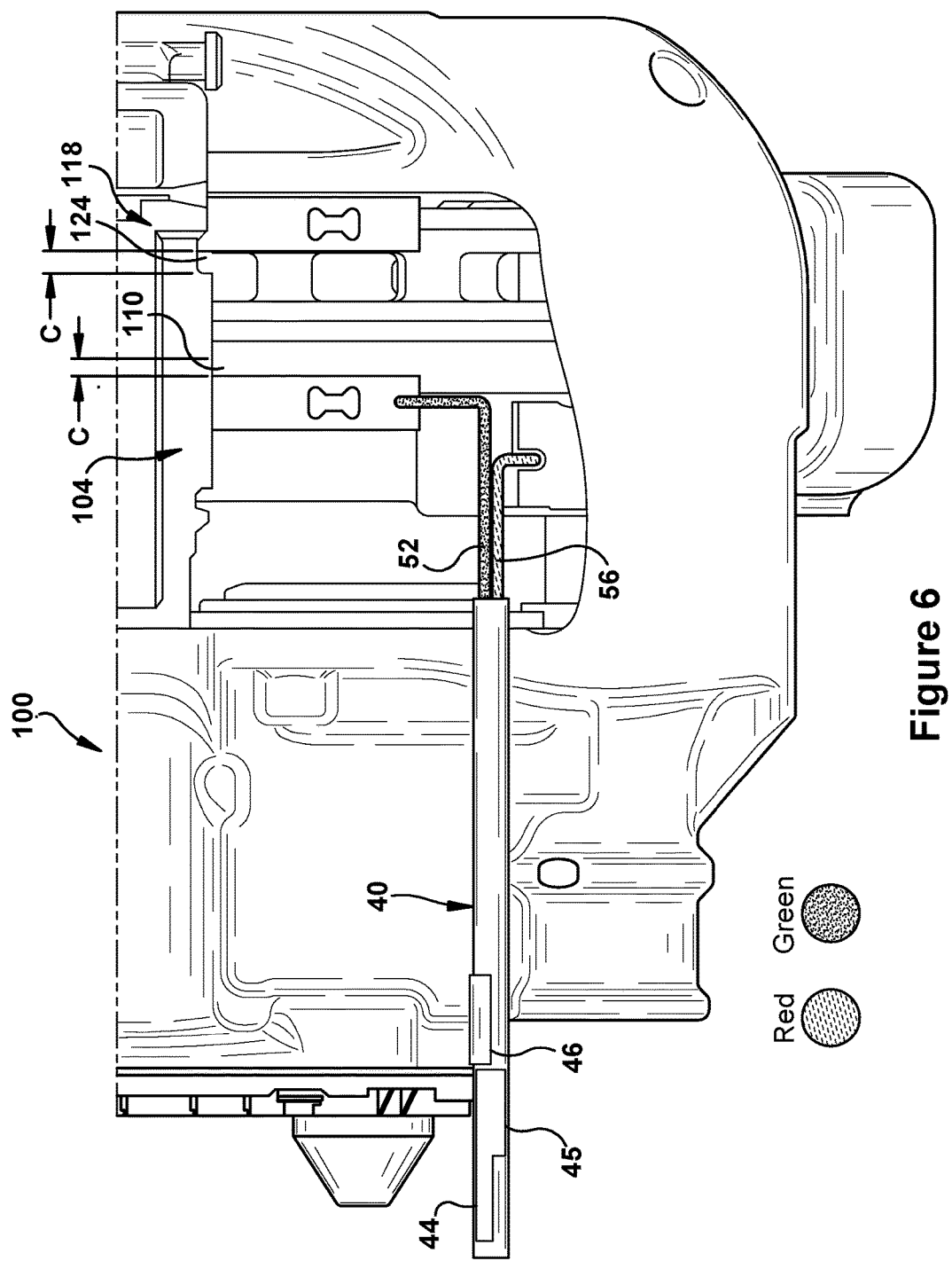
FIG. 6 illustrates the air disc brake assembly as in FIG. 4, where the brake pads are nearly completely worn.

FIG. 6 illustrates the air disc brake assembly 100 having the wear sensing device 40 after a longer period of usage of the brakes. In this example, the friction material 110 of the inboard brake pad assembly 104 and the friction material 124 of the outboard brake pad assembly 118 has almost completely worn, such that the new width C of the friction material 110 and friction material 124 is negligible.

Looking at the wear sensing device 40, neither the inboard member 52 nor the outboard member 56 is visible through the first opening 44 and second opening 45. When wear is even between the inboard brake pad assembly 104 and the outboard brake pad assembly 118, the inboard member 52 and outboard member 56 cease to be visible through the first opening 44 and the second opening 45 at approximately the same time. The entire proximate end 50 of the housing 42 is visible through the first opening 44 and second opening 45. In this situation, the vehicle technician can quickly determine that the pad assemblies 104, 118 need to be replaced. The total travel of the inboard brake pad assembly 104 from new friction material as shown in FIG. 4 to fully worn friction material as shown in FIG. 6 is about 24 mm.

No changes are required to the caliper 102 in order to install the wear sensing device 40. The wear sensing device 40 does not allow moisture or other contaminants into the air disc brake assembly 100 or require changes to the existing adjustment and guidance systems. A minor change may be needed to the carrier 112 to create the insert hole 114, unless a magnet or other method of attachment is used. Therefore, the wear sensing device 40 is a simple, easy to retrofit apparatus for indicating air disc brake pad wear that requires little to no modification of the air disc brake assembly.

Example wear sensor 10 as in FIG. 1 or wear sensor 70 as in FIG. 2 can be substituted in the air disc brake assembly 100.

Therefore, a vehicle disc brake assembly having an air disc brake pad wear apparatus comprises a brake caliper; a brake carrier arranged to receive the brake caliper; a rotor; an inboard brake pad assembly installed in the brake carrier, the inboard brake pad assembly having a retaining device; and the brake pad wear apparatus mounted on the brake caliper. The brake pad wear apparatus includes a housing having a proximate end and a distal end; wherein a first opening is located at the proximate end; and a first rigid member having a proximate end and a distal end and partially contained in the housing, the first rigid member distal end extending from the distal end of the housing and configured to attach to the inboard brake pad assembly; wherein the first rigid member moves linearly in response to the movement of the inboard brake pad assembly such that the proximate end of the first rigid member as seen through the first opening recedes as the inboard brake pad assembly wears.

Monitoring brake wear using the wear sensing device 40 includes installing the wear sensing device 40 to the caliper 102 using the mounting piece 46. The inboard member 52 is coupled to an inboard brake pad assembly 104 at the coupling 54. The coupling can occur at an aperture 109 in the retaining spring 108. As the brake pad friction material 110 wears, the inboard member 52 will move linearly in proportion to the total wear of the brake assembly. Wear is monitored by determining the visibility of the proximate end of the inboard member 52 through the opening 44 in the housing 42. The marking 64 on the housing 42 may also be used to visualize how far the inboard member 52 has moved in response to the total wear of the brake assembly.

The outboard member 56 is coupled to the carrier 112 at the insert hole 114, for example. As the brake pad friction material 124 wears, the outboard member 56 will move linearly in proportion to the wear. As long as wear is relatively even on both the inboard brake pad assembly 104 and the outboard brake pad assembly 118, the length of the visible portion of the outboard member 56 in the second opening 45 is about half of the length of the visible portion of the inboard member 52 in the first opening 44.

Therefore, a method of monitoring brake wear comprises installing a brake pad wear apparatus to a brake pad assembly; wearing the brake pad assembly; and monitoring an at least one rigid member in the brake pad wear apparatus such that the visibility of the interior portion of the brake pad wear apparatus increases as the wear increases.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A brake pad wear apparatus comprising:
   a housing having a proximate end and a distal end; wherein a first opening is located at the proximate end;
   a first rigid member having a proximate end and a distal end and partially contained in the housing, the first rigid member distal end extending from the distal end of the housing and configured to attach to an associated disk brake pad assembly; wherein the first rigid member moves linearly in response to the movement of the associated disc brake pad such that the proximate end of the first rigid member as seen through the first opening recedes as the associated disc brake pad wears; and
   a second rigid member contained in the housing, wherein the second rigid member is configured to attach to an associated component of an air disk brake assembly different from the associated disc brake pad; wherein the second rigid member moves linearly in response to the movement of the associated component such that the proximate end of the second rigid member as seen through a second opening in the housing recedes as the associated component moves.

2. The apparatus as in claim 1, wherein the housing is substantially tubular.

3. The apparatus as in claim 1, wherein the housing has is a color different than a color of the first rigid member.

4. The apparatus as in claim 1, wherein a post is installed in the housing, the post being a different color than the first rigid member.

5. The apparatus as in claim 4, wherein the post becomes more visible as the first rigid member recedes.

6. The apparatus as in claim 1, wherein the first rigid member displays about twice the length of the first rigid member in the first opening as the second rigid member displays in the second opening when the associated disc brake pad is new.

7. The apparatus as in claim 1, further comprising a mounting device attached to the housing configured to mount to an associated air disk brake assembly.

8. A vehicle disc brake assembly comprising:
   a brake caliper;
   a brake carrier arranged to receive the brake caliper;
   a rotor; and
   an inboard brake pad assembly installed in the brake carrier, the inboard brake pad assembly having a retaining device; and
   a brake pad wear apparatus mounted on the brake caliper comprising:
      a housing having a proximate end and a distal end; wherein a first opening is located at the proximate end;
      a first rigid member having a proximate end and a distal end and partially contained in the housing, the first rigid member distal end extending from the distal end of the housing and configured to attach to the inboard brake pad assembly; wherein the first rigid member moves linearly in response to the movement of the inboard brake pad assembly such that the proximate end of the first rigid member as seen through the first opening recedes as the inboard brake pad assembly wears; and
      a second rigid member partially contained in the housing, the second rigid member distal end extending from the distal end of the housing and configured to attach to the brake carrier on the same side of the brake carrier as the inboard brake pad assembly, wherein the second rigid member moves linearly in response to the movement of the associated component such that the proximate end of the second rigid member as seen through a second opening in the housing recedes as the brake carrier moves.

9. The brake assembly as in claim 8, wherein the retaining device of the inboard brake pad assembly is a spring.

10. The brake assembly as in claim 8, wherein the brake pad wear apparatus is mounted to the brake caliper.

11. The brake assembly apparatus as in claim 8, wherein the housing of the brake pad wear apparatus is substantially tubular.

12. The brake assembly apparatus as in claim 8, wherein the housing of the brake pad wear apparatus is a color different than a color of the first rigid member.

13. The brake assembly as in claim 8, wherein the first rigid member measures the overall wear of the inboard brake pad assembly, a rotor and an outboard brake pad assembly and the second rigid member measures the wear of the outboard brake pad assembly.

14. The brake assembly as in claim 8, wherein the first rigid member is a different color than the second rigid member.

15. A method of monitoring brake wear in an air disc brake assembly comprising:
   affixing an inboard member of a brake pad wear apparatus to an inboard brake pad assembly of the air disc brake assembly;
   affixing an outboard member of a brake pad wear apparatus to a carrier of the air disc brake assembly;
   affixing the brake pad wear apparatus to a caliper of the air disc brake assembly;
   wearing the inboard brake pad assembly and an outboard brake pad assembly through actuation of the air disc brake assembly;
   monitoring the inboard member of the brake pad wear apparatus for linear movement through a first opening in the brake pad wear apparatus, wherein a reduction in visibility of the inboard member through the first opening indicates wear of both the inboard brake pad assembly and the outboard brake pad assembly; and
   monitoring the outboard member of the brake pad wear apparatus for linear movement through a second opening in the brake pad wear apparatus, wherein a reduction in visibility of the outboard member through the second opening indicates wear of the outboard brake pad assembly.

16. The method as in claim 15, further comprising comparing the visibility of the inboard member in the first opening and the outboard member in the second opening and determining that the wear of the inboard brake pad assembly and the outboard brake pad assembly is uneven in response to the visible length of the outboard member being less than half of the visible length of the inboard member.

* * * * *